United States Patent [19]

Shperling et al.

[11] 4,367,507
[45] Jan. 4, 1983

[54] APPARATUS FOR CLEARING FAULTS ON UNTRANSPOSED TRANSMISSION LINES USING SINGLE PHASE SWITCHING

[76] Inventors: Betsalel R. Shperling, 135 Third Ave., Mineola, N.Y. 11501; Albert J. Fakheri, 4594 Crompton Dr., Columbus, Ohio 43220; Brendan J. Ware, 2478 Bryden Rd., Columbus, Ohio 43209

[21] Appl. No.: 282,085

[22] Filed: Jul. 10, 1981

[51] Int. Cl.³ .............................................. H02H 9/08
[52] U.S. Cl. ...................................... 361/43; 361/107; 361/1; 361/61; 361/111; 307/103; 307/327
[58] Field of Search ................... 361/43, 111, 110, 67, 361/61, 59, 113, 54, 21, 20, 107, 62, 1; 307/102, 103, 105, 327, 328

[56] References Cited
U.S. PATENT DOCUMENTS 1,537,371  5/1925  Petersen ................................ 361/43
2,180,156  11/1939  Light ................................... 307/102

OTHER PUBLICATIONS

"Compensation Scheme for Single-Pole Switching on Untransposed Transmission Lines" by Shperling et al.; IEEE Transactions, PAS-97, No. 4, Jul.-Aug., 1978, pp. 1421-1429.
"Single-Phase Switching Parameters for Untransposed EHV Transmission Lines" by Shperling; IEEE Transactions, vol. PAS-98, No. 2, Mar./Apr. 1979, pp. 643-654.

Primary Examiner—Patrick R. Salce
Attorney, Agent, or Firm—Pennie & Edmonds

[57] ABSTRACT

A switched four-legged reactor bank which operates in combination with line circuit breakers can be used to extinguish faults on untransposed transmission lines. It comprises three shunt reactors, a neutral reactor and three switches for performing high side reactor switching. The reactor bank also provides transmission line compensation.

8 Claims, 13 Drawing Figures

Neutral Switches

High Side Switches (a)

(b)

APPARATUS FOR CLEARING FAULTS ON UNTRANSPOSED TRANSMISSION LINES USING SINGLE PHASE SWITCHING

TECHNICAL FIELD

This invention relates to means for improving the stability of high voltage transmission line systems by single phase switching. More particularly, it relates to an apparatus for clearing faults in the form of arcs on such systems.

BACKGROUND ON THE INVENTION

Transitory single line to ground faults are the most frequent type of faults on extra high voltage (EHV) and ultra high voltage (UHV) transmission lines. In prior art systems, when these faults occurred, generally, the three poles of transmission line breakers at each end of the line were opened to clear the primary fault. This type of operation can result in power system instability. The extent of this instability depends on breaker opening time, the system configuration, and various system parameters. However, single phase switching when used in conjunction with a proper compensation apparatus can maintain stability in most cases.

In single phase switching schemes, only the breaker poles at each end of the line associated with the faulted phase are opened for a line to ground fault. The breaker poles associated with the unfaulted phases remain closed. The phase which is opened at both ends to clear a line to ground fault, however, is inductively and capacitively coupled to the unfaulted load-carrying phases energized at a normal system voltage. This coupling, if not compensated, can maintain the secondary arc along the path of the primary fault current and prevent successful reclosing unless the phase is opened for an excessively long interval of time. The secondary arc extinction time depends on variables such as secondary arc current, voltage across the arc path, primary fault current, fault location, arc length, and meterological conditions. Of these variables, the secondary arc current and the voltage across the secondary arc are the most important. These can be reduced by an appropriate compensation apparatus.

One type of compensation apparatus which has been used in single phase switching of transposed lines is illustrated in FIG. 1. It is called a simple four-legged reactor bank. This four-legged reactor bank 10 consists of shunt inductive reactors 12, 14 and 16 which are normally employed on an extra high voltage transmission line for compensation of line capacitance of the phases A, B and C of the line, and an additional reactor 18 which is connected from the neutral of the shunt reactors to ground. Such four-legged reactor banks properly compensate interphase capacitances and phase to ground capacitances of equal magnitude. Methods for calculating the inductance, current ratings and voltage ratings of these inductors are well known in the art.

This compensation apparatus, which is useful for a transposed transmission line, will not generally reduce the secondary arc current sufficiently on long untransposed transmission lines because of unequal line interphase capacitances.

The present inventors, in "Compensation Scheme for Single-Pole Switching on Untransposed Transmission Lines," published in *IEEE-Transactions on Apparatus and Systems*, Vol. PAS-97, No. 3 (July/August 1978) analysed a modified four-legged reactor bank using four switches whose operations are coordinated with the line breakers. According to this compensation scheme an untransposed transmission line system utilizes a simple four-legged reactor bank to provide sufficient compensation between outer phases of the transmission line, while the modified four-legged reactor bank provides the additional compensation required for the mid-to-outer-phase capacitances.

The principles of operation of this modified four-legged reactor bank are best illustrated in FIG. 2. Referring to FIG. 2b, a center phase fault, consisting of an arc from phase conductor B to ground is shown. A reactor bank 20 in this case is configured in a manner identical to reactor bank 10 of FIG. 1. Provided the inductance values of shunt reactors 22, 24 and 26, and neutral reactor 28 are properly chosen, the secondary arc current $I_f$ will be compensated, that is, reduced to a small value or held to a low enough value that it will be extinguished in a reasonable time with respect to system stability requirements. During this time, the breakers associated with phase B are opened at both ends of the transmission line.

FIGS. 2a and 2c illustrate the configurations of reactor bank 20 necessary to extinguish faults in the form of arcs to ground on phases A and C, the outer phases, respectively. The shunt inductor associated with the unfaulted outer phase, inductor 26 in FIG. 2a, and inductor 22 in FIG. 2c, is switched so that its side opposite the side connected to the unfaulted phase is connected to ground rather than to the ungrounded side of neutral inductor 28. Shunt reactor 24 associated with center phase B and the shunt reactor associated with the faulted phase (inductor 22 in FIG. 2a and inductor 26 in FIG. 2c) are both connected to the ungrounded side of neutral reactor 28. The breakers associated with the faulted phase are opened for a period of time sufficient to extinguish the arc.

FIG. 3 illustrates how four switches 30, 32, 34 and 36 are incorporated into reactor bank 20 to configure reactor bank 20 to clear faults on phases A, B and C. During normal system operation, when no faults exist, switches 30, 32, 34 and 36 remain closed. When a fault occurs on phase B an apparatus for sensing a fault condition on that phase produces a signal which causes switches 34 and 36 to open producing the configuration of FIG. 2b. This signal also causes the line breakers associated with phase B to open.

The apparatus or means for sensing the fault is of a type well known in the art. Generally, it responds to a sudden substantial increase in current on the faulted phase due to the presence of a fault condition as illustrated in FIG. 3a. When a fault occurs on phase A switches 32 and 34 are opened in response to a signal from a means for sensing a fault on phase A. Switches 30 and 36 remain closed. Thus the configuration of FIG. 2a is produced. Line breakers associated with phase A are temporarily opened and the arc is extinguished.

A similar series of events occurs for a fault on phase C, but as will be appreciated by referring to FIG. 3c, in this case switches 30 and 36 are opened while switches 32 and 34 remain closed, producing the configuration of FIG. 2c. Line breakers associated with phase C are now opened and reclosed after a period of time in which the fault is cleared.

For successful simple phase switching the reactive admittance matrix for the simple and switched compensation banks must match the line capacitive admittance matrix. The inventors in the above cited paper have developed expressions for the admittance matrix of the modified or switched four-legged reactor bank for the above configurations and for the equivalent admittances of the transmission line for faults at various locations. The equations needed for simplified secondary arc current calculations are provided and a graphical method of solving for neutral reactor values which limit the maximum steady state secondary arc current to a given value is developed. Using this method, now well known in the art, solutions are expressed in terms of permissible ratios of reactance of the neutral inductor to the reactance of the shunt inductor in the simple four-legged reactor bank and permissible ratio of the reactance of the neutral inductor to the reactance of the shunt inductor in the switched four-legged reactor bank which can be used when a particular permissible ratio in the simple four-legged reactor bank is selected. Alternatively, a particular ratio may be selected for the modified or switched reactor bank, and a permissible ratio for the simple four-legged bank selected. Expression for secondary arc current, neutral reactor voltages and recovery voltages needed to produce a practical system are also computed and plotted.

In "Single-Phase Switching Parameters for Untransposed EHV Transmission Lines" published in *IEEE Transactions on Apparatus and Systems*, Vol. PAS-98 (March/April 1979), B. R. Shperling and A. Fakheri, two of the present inventors, have outlined the results of calculations following the general method outlined above for using a modified four-legged reactor bank of the type shown in FIG. 3 on a 765 kilovolt untransposed transmission line. The results of these calculations for various transmission lines lengths are disclosed. The various configurations show (1) a modified and simple reactor bank at the transmission line terminals; (2) a modified reactor bank at only one of the line terminals; and (3) three shunt reactor banks at the line terminals.

The length of the transmission line determines which of the above configurations should be used. The ratios of the reactants of the neutral inductor to that of the shunt reactors for each arrangement and for various lengths of transmission lines for arrangements 1 and 2 is plotted as a function of the compensation factor $h_g$ which is defined as the ratio of the reactive component of the shunt reactors (KVA reactive) over the capacitive component of the transmission line (KVA capacitive).

While the system arrangements disclosed in the above mentioned paper are adequate for clearing faults on a large variety of untransposed transmission lines by using single phase switching it will be recognized by one skilled in the art that the nature of the load on a given transmission line varies greatly as the load on that line is changed. For example, during periods of heavy loading the load presented results in a large inductive component in the secondary arc current. This component is greatly reduced under conditions of light loading.

The modified four-legged reactor bank described above must always be connected to the transmission line to extinguish arcs regardless of the condition of the load. Keeping such a reactor on the line permanently results in an uneconomical load distribution in the system. It is required, therefore, in many systems to switch off the shunt reactors during heavy load conditions and, at the same time, have them available for extinguishing the secondary arcs after single phase to ground faults. An extra set of three high voltage breaker switches and associated control circuits are therefore required.

DISCLOSURE OF THE INVENTION

The present invention solves this problem while providing an apparatus for extinguishing faults on an untransposed alternating current transmission line having two outer phase conductors and an inner phase conductor. It comprises a switch connected from each of the three phases of the untransposed transmission line to a shunt reactor associated with each of the phases. A neutral reactor is connected from system ground to the side of each of the shunt reactors opposite the switch. Sensing means are provided for sensing a fault condition on each phase of the transmission line. A line breaker means responsive to each fault sensing means provides a signal which temporarily disconnects the phase with the fault condition from the power source system and the power receiving system which the transmission line connects. During this disconnection period a fault on the inner phase conductor is extinguished by configuring the apparatus in response to the fault signal so that all three switches are closed. If a fault occurs on an outer phase, the fault signal causes the apparatus to be configured, so that the switch associated with the inner phase conductor and the switch connected to the faulted outer phase are closed and the switch connected to the unfaulted phase is open.

These configurations may be achieved whether all of the switches are initially closed or initially open when no fault condition exists. Thus, the apparatus can also be used to compensate for changes in load condition by having it normally switched on to the transmission line under light loading conditions and switched initially off the line when heavy loading exists and compensation is not required. A simple change in the logic well known in the art used to operate the switches will produce the configurations outlined above necessary to extinguish the inner phase conductor or the outer phase conductor faults regardless of the initial configuration.

BRIEF DESCRIPTION OF THE DRAWINGS

Further objects and advantages of the invention may be ascertained by reference to the following specification and the accompanying drawings, in which.

DETAILED DESCRIPTION OF THE INVENTION

Figure 1:
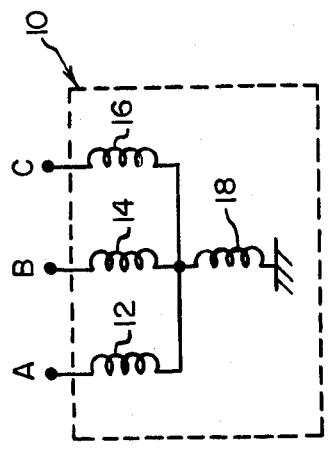
FIG. 1 is a schematic diagram of a simple four-legged reactor bank.
Figure 2:
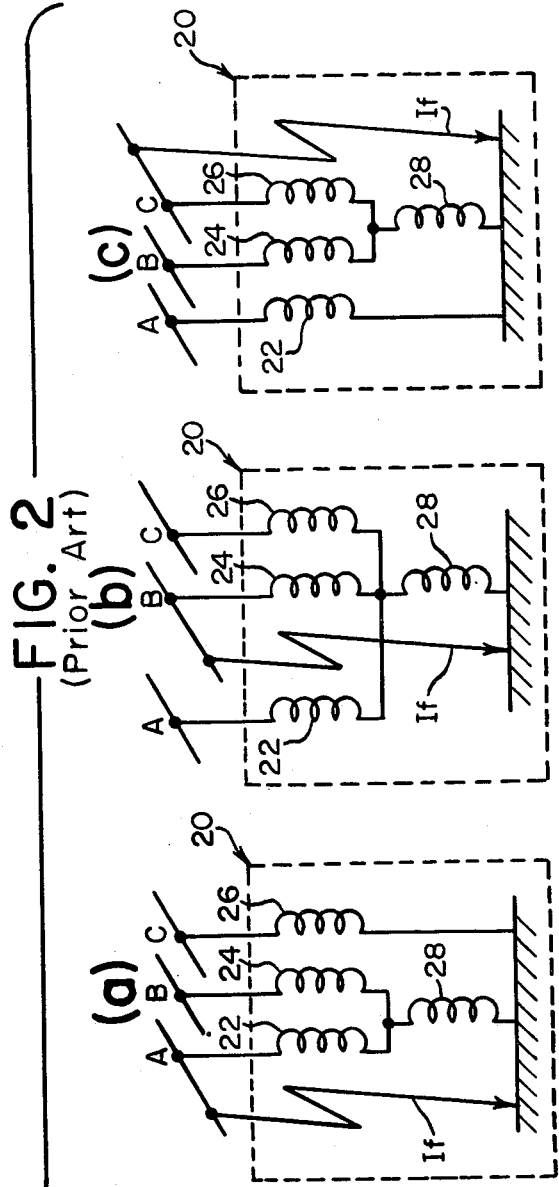
FIG. 2 illustrates a fault clearing scheme previously developed.
Figure 3:
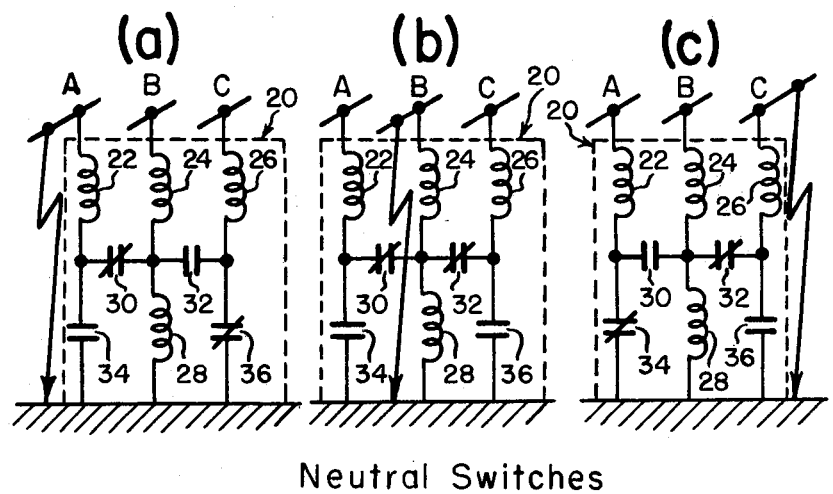
FIG. 3 shows three possible configurations for a modified or switched four-legged reactor bank implementing the scheme of FIG. 2 and using neutral side switching.
Figure 4:
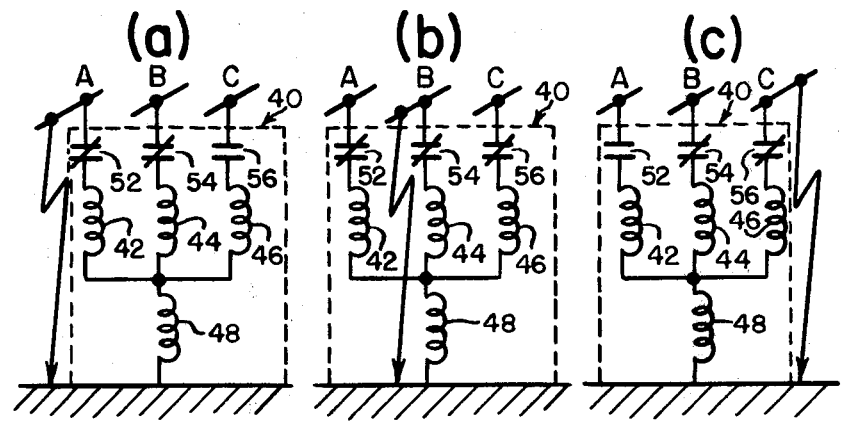
FIG. 4 shows three configurations of the present invention, a modified four-legged reactor bank using high side switching to extinguish faults on the three phases of the transmission line.

Schematic diagrams of an apparatus according to the present invention configured to extinguish phase conductor to ground faults on all three phases of an untransposed transmission line carrying alternating current are shown in FIG. 4. A modified or switched reactor bank 40 includes shunt inductive reactors 42, 44 and 46 as well as neutral inductive reactor 48. Switches 52, 54 and 56 connect and disconnect reactors 42, 44 and 46 from phase conductors A, B and C respectively as shown in FIG. 4.

To extinguish an inner phase fault that is a fault on phase B, switched reactor back 40 is configured so that switches 52, 54 and 56 are closed as shown in FIG. 4b. To extinguish a fault on phase A, one of the outer phases, switch 52 the switch associated with phase A (the faulted outer phase, and switch 54 the switch associated with inner phase B must be closed, while switch 56 associated with phase C) which is not faulted, must remain open as shown in FIG. 4a. Similarly, when a fault occurs on outer phase C, switches 54 and 56 are closed, while switch 52 associated with unfaulted outer phase A is open as shown in FIG. 4c.

While it might be possible to construct a switched reactor bank 40 in which the values of inductance of reactors 42, 44 and 46 are not equal in order to meet special unbalanced load requirements generally this is not necessary. In the overwhelming majority of cases the inductances of reactors 42, 44 and 46 will be identical.

While the inductance of reactors 42, 44 and 46 may be chosen to provide permissible ratios of reactances as outlined in the paper by the present inventors cited above, especially when used with simple four-legged reactor banks, as a practical matter such calculations are often unnecessary. Since system conditions often vary widely with changes in load, total system phase compensation can never be achieved at all times without using extremely expensive and impractical adjustable inductive reactors or connecting and disconnecting several reactor banks. In practice a single reactor bank is switched in and out to accommodate changes in load conditions. Perfect phase compensation, that is phase compensation where the compensation factor $h_g$ is equal to 1.0 is achieved only rarely and then usually not for any great length of time.

Methods for calculating the inductance of shunt reactors required to achieve optimum compensation over a total operating period of a given transmission line system, rather than at any given time are well known to those skilled in the art. The inductance of reactors 42, 44 and 46 can be determined in this manner. The value of compensation factor $h_g$ for typical operating conditions can then be determined by computing the ratio of the inductive volt-amp component to the capacitive volt-amp component on the transmission line. Ratings of the neutral reactor for arrangements using a single switched reactor bank 40, or the values of the neutral reactors for a simple reactor bank 10 and a switched reactor bank 40 where one or more reactor banks 40 are used in combination with a simple reactor bank 10 may then be determined with reference to FIGS. 7 through 10 which are more fully described below.

Switches 52, 54 and 56 are preferably of the air blast breaker variety but other breaker types of suitable rating may also be used. Typical switch opening and closing times are generally two to four and five to six cycles of the power frequency, respectively.

Figures 5, 6:
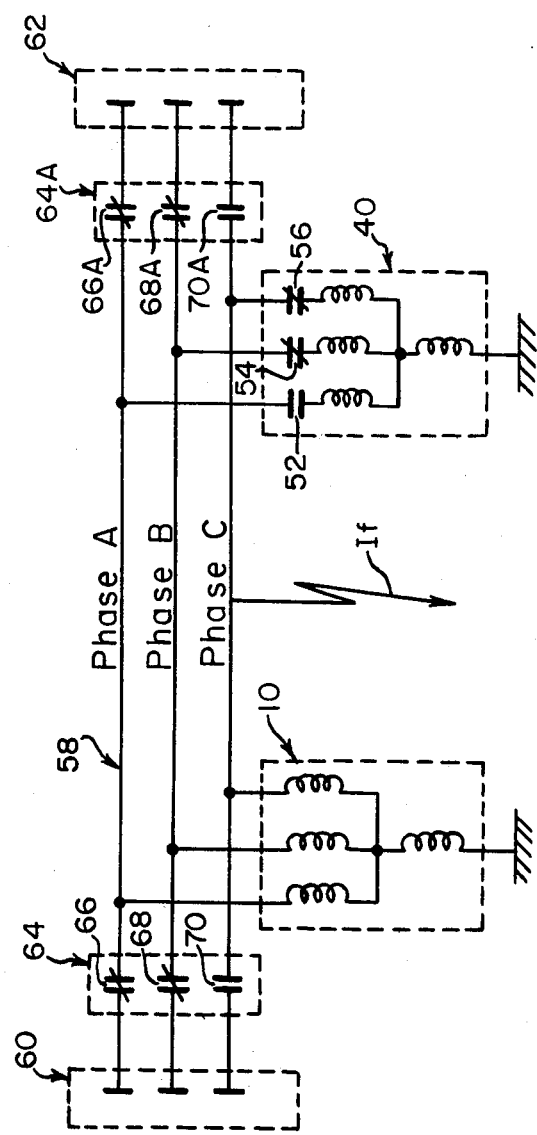
FIG. 5 is a schematic system diagram of a transmission line using one simple and one switched reactor bank.
FIG. 6 is a table which diagramatically illustrates the systems arrangement of FIG. 5 and two other possible system arrangements.

FIG. 5 is a schematic diagram of a typical system in which the present invention may be utilized. An untransposed transmission line 58 comprised of phase conductors A, B, and C connects a power source system 60 to a power receiving system 62 which may be the load to which power is being supplied.

Generally phase conductors A, B and C are parallel to one another and are disposed in a horizontal plane; that is a plane which is parallel to the earth's surface. Phase conductor B is the center or inner conductor from which phase conductors A and C are generally equally spaced in opposite directions. Thus phase conductors A and C are the outer phases in the sense that they are disposed on either side of phase conductor B and there are no phase conductors located a greater distance from phase conductors B. One or more ground wires may be located in a plane significantly above the plane of conductors A, B and C to provide some protection from lightning.

In some cases phase conductors A, B and C may be located in a vertical plane. In this case conductor A would be at the greatest height from the earth's surface, conductor C at the lowest height, and phase conductor B spaced halfway between them.

While conductors A, B and C are generally coplanar, it is possible for one conductor, for example, to be parallel to the plane of conductors A and C but somewhat displaced perpendicularly from this plane. While a significant displacement would change the transmission line admittance matrix and thus effect the results obtained by the graphical solution in the paper cited above, for most practical transmission lines the approach used for picking an inductance value for neutral reactor 48 to produce proper compensation outlined above will be adequate.

It is useful to point out that the switched reactor bank 20 which uses neutral reactor switching and the reactor bank 40 of the present invention utilizing high side switching result in the same interphase as well as faulted phase to ground equivalent impedances and therefore correspond to identical single phase switching compensation parameters for a given line.

A simple four-legged reactor bank 10 may be located at or near the end of transmission line 58 associated with power source system 60. A modified or switched four-legged reactor bank 40 according to the invention is connected at or near the end of transmission line 58 associated with power receiving system 62. Line breakers 64 and 64A each having a pole for phases A, B, and C are provided for implementing single phase switching.

Each phase of transmission line 58 has a fault sensing apparatus (not shown) of the type previously described and well known in the art associated with it. Upon detection of a fault, a fault signal identified to the faulted phase is produced. Appropriate logic which constitutes a means responsive to the fault sensing means causes the breaker poles of line breakers 64 and 64A associated with the faulted phase to open in response to the signal created by the fault sensing apparatus. Switches 52, 54 and 56 of reactor bank 40 are closed or opened as described above with respect to FIG. 4 to compensate as far as possible the secondary arc current $I_f$ and extinguish the fault. After a period of time sufficient to extinguish the fault, typically in 0.5 second, switches 52, 54 and 56 return to their pre-fault all open or all closed conditions, as required for line compensation and the breaker poles associated with the faulted phase are closed.

In FIG. 5 the faulted phase is phase C as shown by the arc from phase C to ground. Line breaker poles 66 and 66A associated with phase A and line breaker poles 68 and 68A associated with phase B, both unfaulted phases, remain closed. Line breaker poles 70 and 70A, associated with faulted phase C are opened as a result of the action of appropriate logic control means (not shown) responsive to the fault sensing means associated with phase C while the secondary arc is extinguished.

The line breakers may be two cycle air-blast circuit breakers of a type well known in the art.

It is important to note that reactor banks 10 and 40 must remain connected to the transmission line during single phase switching for effective operation. Thus reactor bank 10 can not be connected to the system between power source system 60 and breaker 64, and reactor bank 40 can not be connected to the system between power receiving system 62 and breaker 64A.

The system arrangement shown schematically in FIG. 5 is diagrammatically illustrated in arrangement A shown in FIG. 6. Line L represents the transmission line. RS represents a simple four-legged reactor bank 10. RM represents the modified or switched reactor bank 40 of the invention.

In the Shperling and Fakheri paper cited above dealing with extra high voltage (EHV) transmission lines typical inductance ratio values for a 765 kilovolt untransposed transmission line with conductors in a horizontal plane and center-to-outer phase capacitances 3.5 to 3.9 times larger than outer-to-outer phase capacitances were determined and plotted as a function of $h_g$ for various system arrangements. The three phase capacity of each shunt reactor bank was assumed to be equal to 150 or 300 MVAr. Calculations were performed for typical line parameters with power flow along the line equal to surge impedance loading in each direction during normal system conditions. Each equivalent source reactance was assumed to be approximately 20 percent of the line surge impedance with its resistive part equal to 10 percent of the reactance value.

Arrangements B in FIG. 6 is particularly useful for transmission line lengths of 50 to 210 kilometers, as indicated in Table 1 below. Arrangement C in FIG. 6 may be used for transmission line lengths of 210 to 350 kilometers. Arrangement A may be used for transmission line lengths up to 105 to 305 kilometers.

Figure 7:
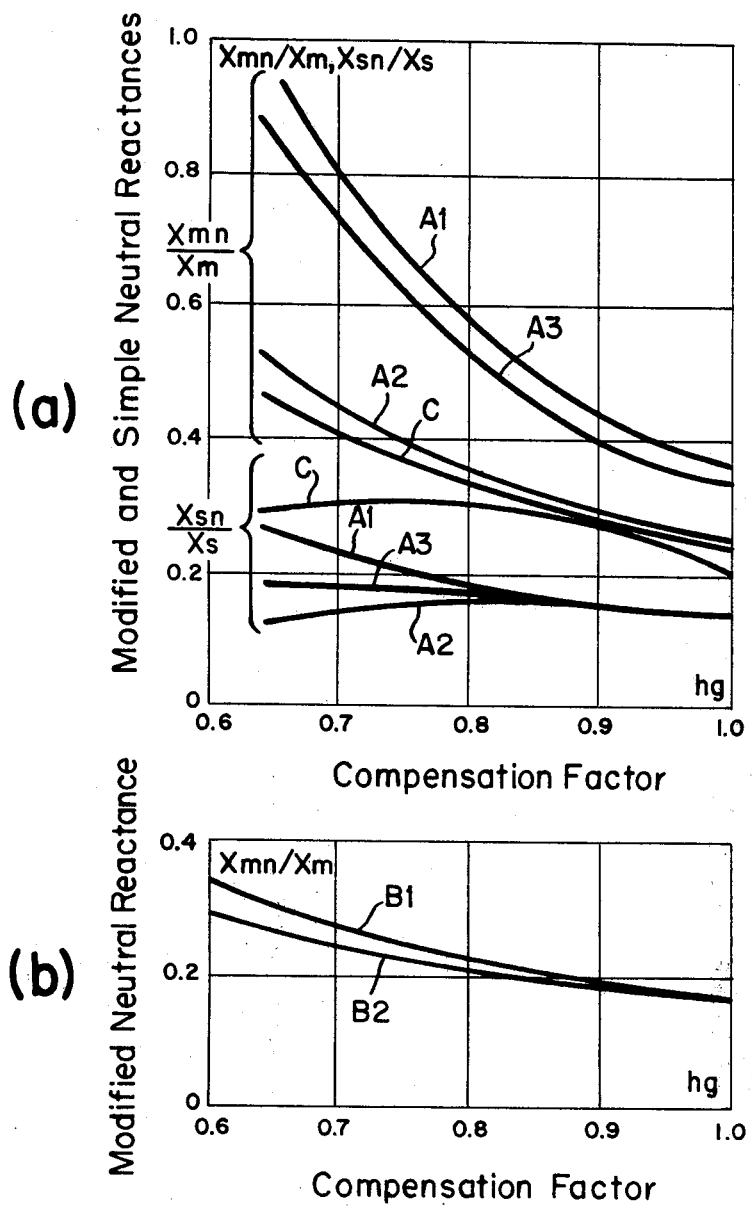
FIG. 7 is a plot of the proper ratios for the values of the neutral reactor to the shunt reactors as a function of compensation factor in both the simple and switched reactor banks for various lengths of transmission lines arranged according to FIG. 6.

FIG. 7 contains a series of plots of the ratio of neutral reactor inductive reactance to shunt reactor inductive reactance (or equivalently the inductance ratios) for the simple and modified reactor banks utilized in the system arrangements listed in Table 1. In FIG. 7 and the remaining figures the subscript "s" refers to the simple four-legged reactor bank 10, while the "m" refers to the modified or switched reactor bank. The letter "n" in a subscript refers to the neutral reactor, while its absence indicates the shunt reactor.

TABLE 1

| Reactor Arrangements from FIG. 6 | | Line Length L km | Shunt Reactor Capacity | | $H = \dfrac{Q_{RS}}{Q_{RM}}$ | COMPENSATION FACTOR $h_g$ |
|---|---|---|---|---|---|---|
| | | | $Q_{RM}$ MVAr | $Q_{RS}$ MVAr | | |
| A | 1 | 105–175 | 150 | 150 | 1 | 0.6–1.0 |
|   | 2 | 155–260 | 300 | 150 | ½ | 0.6–1.0 |
|   | 3 | 210–350 | 300 | 300 | 1 | 0.6–1.0 |
| B | 1 | 50–105  | 150 | —   | 0 | 0.5–1.0 |
|   | 2 | 105–210 | 200 | —   | 0 | 0.5–1.0 |
| C |   | 210–350 | 300 + 150 | 150 | ⅓ | 0.6–1.0 |

Figure 8:
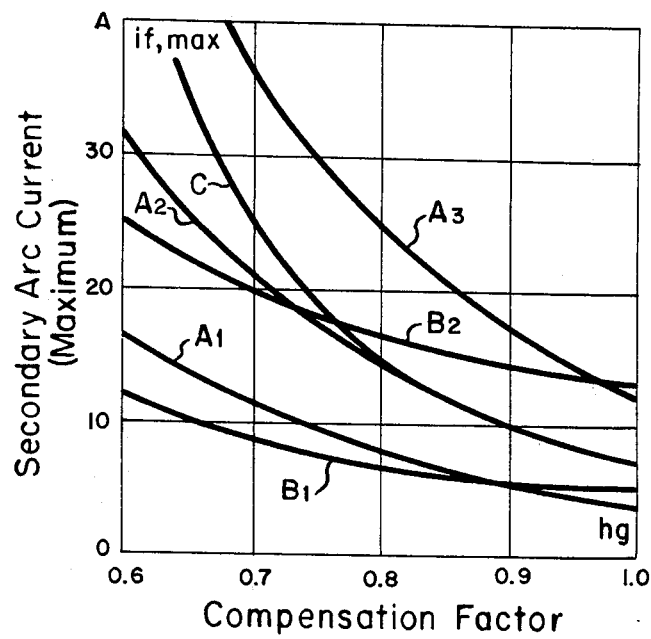
FIG. 8 is a plot of the maximum value of the secondary arc current as a function of the compensation factor for the configurations of FIG. 6.

In FIG. 8 the maximum secondary currents in amperes are plotted. As expected these currents are minimized as $h_g$ approaches 1.0.

Figure 9A:
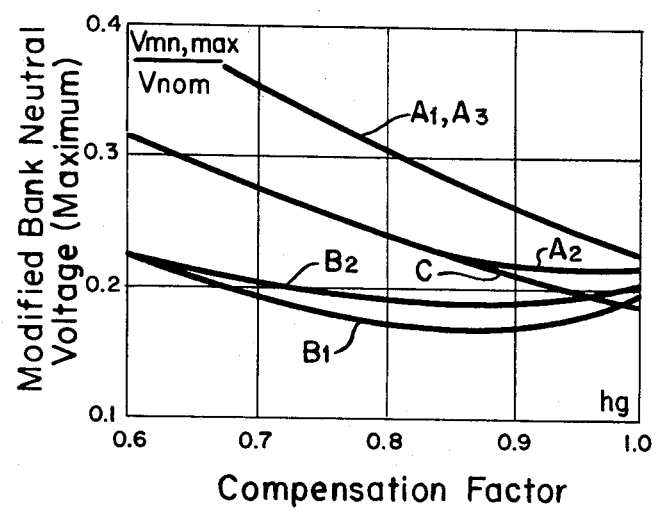
FIG. 9 is a plot of the ratios of the modified bank neutral voltage and simple bank neutral voltage to the nominal line voltage as a function of compensation factor for the arrangements of FIG. 6.
Figure 9B:
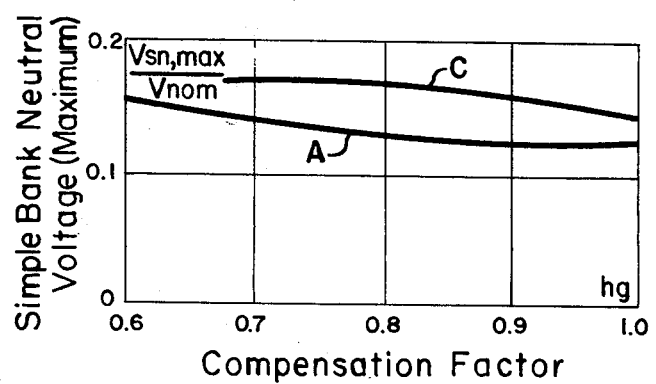
Figure 10:
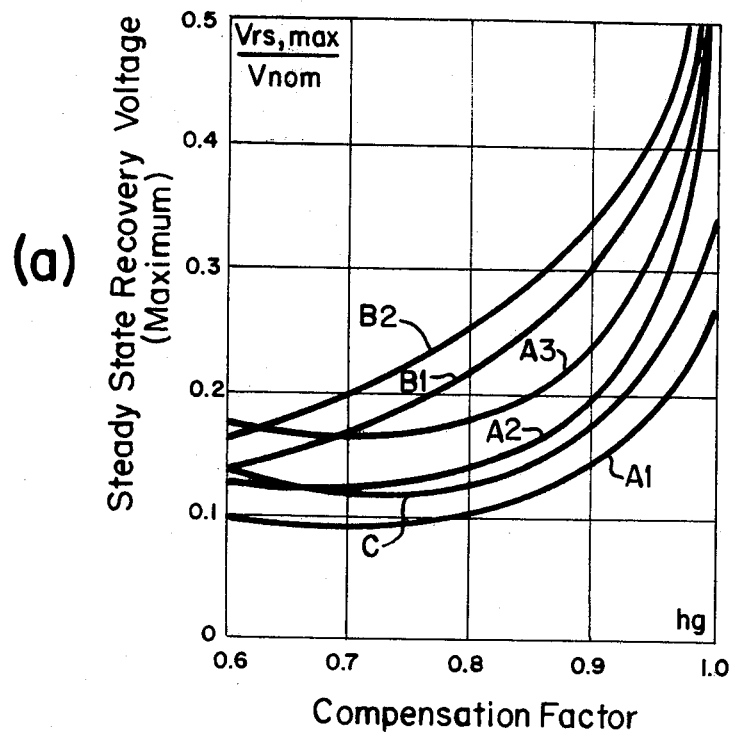
FIG. 10 is a plot of the ratios of steady state recovery voltage and the transient recovery voltage to the nominal line voltage as a function of compensation factor for the arrangements of FIG. 6.
Figure 10:
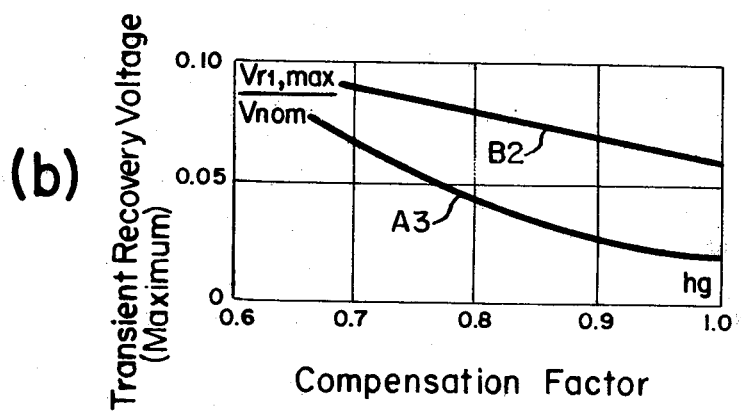

In FIG. 9a the maximum modified bank neutral reactor voltage expressed as a fraction of the nominal phase to ground voltage $V_{nom}$ is plotted as a function of $h_g$ for the various configurations. FIG. 9b shows the same data for the simple reactor bank neutral voltage.

The phase-to-ground voltage on the opened phase builds up in a transient process after the arc extinguishes. The lowest natural frequency for this process is close to 60 Hz for all of the arrangements of FIG. 6. Steady-state recovery voltage or sustained voltage, therefore, is established in a beating process rather slowly depending on $h_g$ and the shunt reactor arrangement. In addition to the steady-state recovery voltage which indicates the general trend for the transient process, the first peak of the recovery voltage is important in the possibility of secondary arc restrike.

Sustained voltage $v_{rs,\ max}$ versus $h_g$ for each of the reactor arrangements listed in Table 1 is plotted in FIG. 10a. This voltage correlates to the compensation factor $h_g$ with the trend opposite to the $i_{f,\ max}$ dependency on $h_g$, that is, $v_{rs,\ max}$ increases with the increase of $h_g$. Similar to $i_{f,\ max}$ the sustained voltage $v_{rs,\ max}$ depends on line length and ratio H. Thus, for given $h_g$ and H as defined in Table 1, $v_{rs,\ max}$ increases with the line length (compare schemes A1 and A3 with H=1 and B1 and B2 with H=0). The $v_{rs,\ max}$ dependency on H for given $h_g$ and L is more complex: a first $v_{rs,\ max}$ decreases with the reduction of H (compare schemes A3 and C with H=1 and ⅓ respectively) and then increases again (compare schemes A3 and B3 with H=1 and zero respectively). Comparing the last results with the data for the secondary arc current, it can be concluded that $i_{f,\ max}$ and $v_{rs,\ max}$ dependencies on H (for given $h_g$ and L) are similar.

The transient recovery voltage and, in particular, the first peak of $v_r$, contrary to $v_{rs}$, decreases with the increase of $h_g$. The maximum values of $v_{rl,\ max}$ versus $h_g$ for the schemes A3 and B2 of Table 1 are presented in FIG. 10b. The recovery voltage on the opened phase builds up more slowly for larger $h_g$ which corresponds to a smaller difference between the lowest natural frequency and 60 Hz. This results in a larger envelope period and, therefore, a smaller first peak of the recovery voltage. The voltage $v_{rl,\ max}$ for all of the schemes does not exceed approximately 0.1 $v_{nom}$ or approximately 45 $kV_{rms}$. The schemes which are not presented in FIG. 10b result in lower $v_{rl,\ max}$ than configuration A3. The minimum value of $v_{rl}$ does not exceed 0.02 $v_{nom}$ or approximately 10 kV for 765 kV transmission lines and is practically independent of the reactor arrangements of FIG. 6 used.

Reference to FIGS. 7 through 10 will enable one skilled in the art to select appropriate design values for the components used to produce the modified reactor banks of the present invention, suitable for transmission lines other than the 765 kV line used as an example above. In addition surge arrestors may be used as required in order to reduce neutral reactor insulation requirements.

While the invention has been described in connection with only a number of specific embodiments, it is to be understood that these are merely illustrative of the many other specific embodiments which can also utilize the principles of the invention. Numerous and varied devices can be made by those skilled in the art without departing from the spirit and scope of the present invention, as defined by the following claims.

We claim:

1. An apparatus for extinguishing faults on an untransposed alternating current transmission line having two outer phase conductors and an inner phase conductor used to transfer power from a power source system to a power receiving system, including means for sensing a fault condition on each phase of said transmission line, and line breaker means responsive to each of said fault sensing means for temporarily disconnecting the single phase with said fault condition from said power source system and said power receiving system until said fault is extinguished, said apparatus comprising:
   (a) a switch connected from each of said outer phase conductors and a switch connected from said inner phase conductor of said untransposed transmission line to a shunt reactor associated with each of said phases;
   (b) a neutral reactor connected from the ground to the side of each of said shunt reactors opposite said switch;
   (c) means responsive to said fault sensing means for configuring said apparatus so that said three switches are closed to extinguish faults on said inner phase conductor; and
   (d) means responsive to said fault sensing means for configuring said apparatus so that said inner phase conductor switch and the switch connected to a faulted outer phase conductor are closed and said switch of said phase opposite said faulted outer phase is open to extinguish a fault on said faulted outer phase.

2. The apparatus of claim 1 in which all of said switches are closed when no fault condition exists.

3. The apparatus of claim 1 in which all of said switches are open when no fault condition exists.

4. The apparatus of claim 1 used with a transmission line in which the inner and outer phase conductors are coplanar.

5. The apparatus of any of claims 1, 2, 3 or 4 used in combination with a simple four legged reactor bank which is connected to said transmission line.

6. The apparatus of any of claims 1, 2, 3 or 4 in which said shunt reactors associated with each of said three phases are of equal inductance value.

7. The apparatus of any of claims 1, 2, 3 or 4 in which said switches are air breakers.

8. The apparatus of any of claims 1, 2, 3 or 4 designed to provide transmission line compensation during normal no fault conditions.

* * * * *

UNITED STATES PATENT AND TRADEMARK OFFICE
CERTIFICATE OF CORRECTION

PATENT NO. : 4,367,507
DATED : January 4, 1983
INVENTOR(S) : Betsalel R. Shperling et al It is certified that error appears in the above—identified patent and that said Letters Patent is hereby corrected as shown below:

Column 5, line 26, "back" should read --bank--.

Column 8, line 50, "B3" should read --B2--.

Signed and Sealed this

Nineteenth Day of April 1983

[SEAL]

Attest:

GERALD J. MOSSINGHOFF

Attesting Officer     Commissioner of Patents and Trademarks